United States Patent
Prigent (10) Patent No.: US 11,827,198 B2
(45) Date of Patent: Nov. 28, 2023

(54) EMERGENCY HYDRAULIC BRAKING METHOD AND CIRCUIT FOR COUPLING

(71) Applicant: POCLAIN HYDRAULICS INDUSTRIE, Verberie (FR)

(72) Inventor: André Prigent, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 516 days.

(21) Appl. No.: 17/258,791

(22) PCT Filed: Jul. 5, 2019

(86) PCT No.: PCT/FR2019/051678
§ 371 (c)(1),
(2) Date: Jan. 8, 2021

(87) PCT Pub. No.: WO2020/012096
PCT Pub. Date: Jan. 16, 2020

(65) Prior Publication Data
US 2021/0268999 A1 Sep. 2, 2021

(30) Foreign Application Priority Data
Jul. 10, 2018 (FR) ...................................... 1856343

(51) Int. Cl.
*B60T 13/68* (2006.01)
*B60T 8/17* (2006.01)

(52) U.S. Cl.
CPC .......... *B60T 8/1708* (2013.01); *B60T 13/686* (2013.01); *B60T 2270/402* (2013.01)

(58) Field of Classification Search
CPC ...... B60T 8/1708; B60T 13/16; B60T 13/263; B60T 13/265; B60T 13/68; B60T 13/686; B60T 2270/402
See application file for complete search history.

(56) References Cited

U.S. PATENT DOCUMENTS

| 5,251,966 A * | 10/1993 | Friederichs ............. B60T 13/66 |
| | | 188/3 R |
| 10,239,502 B2 * | 3/2019 | Leinung .................... B60T 7/20 |
| 2013/0124058 A1 | 5/2013 | Perlick et al. |

(Continued)

FOREIGN PATENT DOCUMENTS

| FR | 3037023 A1 | 12/2016 |
| GB | 2196074 A | 4/1988 |

(Continued)

OTHER PUBLICATIONS

"Regulations: Commission Delegated Regulation (EU) 2015/68", Official Journal of the European Union, Oct. 15, 2014, 139 pages.

*Primary Examiner* — Bradley T King
(74) *Attorney, Agent, or Firm* — THE WEBB LAW FIRM (57) ABSTRACT

A method for driving a parking brake of a vehicle (V) wherein:

for a setpoint between 0 and C1, the control pressure (200) is zero, and the supplementary pressure (100) is non—zero constant;

for a setpoint between C1 and C3, the control pressure is proportional to the setpoint, for a setpoint between C2 and Cmax, the supplementary pressure is zero;

said values being such that

0<C1<C2<Cmax, and

0<C1<C3<Cmax.

20 Claims, 4 Drawing Sheets

(56) References Cited

U.S. PATENT DOCUMENTS

| | | | |
|---|---|---|---|
| 2018/0273013 A1* | 9/2018 | Niglas | B60T 8/88 |
| 2018/0273014 A1* | 9/2018 | Boulivan | B60T 8/1701 |
| 2019/0106093 A1* | 4/2019 | Lemaitre | B60T 13/16 |
| 2019/0263371 A1* | 8/2019 | Goers | B60T 15/027 |
| 2020/0047730 A1* | 2/2020 | Van Thiel | B60T 8/1708 |
| 2020/0094795 A1 | 3/2020 | Butti et al. | |
| 2020/0139952 A1* | 5/2020 | Van Thiel | B60T 13/385 |
| 2021/0269003 A1* | 9/2021 | Prigent | B60T 15/028 |
| 2021/0276522 A1* | 9/2021 | Harrison | B60T 15/246 |
| 2023/0021986 A1* | 1/2023 | Nemeth | B60T 13/683 |
| 2023/0063569 A1* | 3/2023 | Farres | B60T 13/662 |

FOREIGN PATENT DOCUMENTS

| | | |
|---|---|---|
| GB | 2540346 A | 1/2017 |
| WO | 2017050632 A1 | 3/2017 |
| WO | 2018100489 A1 | 6/2018 |

\* cited by examiner

EMERGENCY HYDRAULIC BRAKING METHOD AND CIRCUIT FOR COUPLING

CROSS-REFERENCE TO RELATED APPLICATIONS

This application is the United States national phase of International Application No. PCT/FR2019/051678 filed Jul. 5, 2019, and claims priority to French Patent Application No. 1856343 filed Jul. 10, 2018, the disclosures of which are hereby incorporated by reference in their entirety.

BACKGROUND OF THE INVENTION

Field of the Invention

The present invention relates to the field of vehicles equipped with a hydraulic circuit and suitable for receiving a coupling such as a trailer.

Description of Related Art

Hydraulic braking systems for vehicles that can be equipped with a coupling, for example tractors, comprise a control line and a supplementary line linking the vehicle to its coupling.

The control line is driven by the user, as a function of a braking setpoint which it applies, for example by pressing on a service brake pedal of the vehicle.

The supplementary line, meanwhile, is typically supplied with pressure by a pump delivering a fixed and relatively low pressure.

Vehicles that can be equipped with a coupling also comprise an emergency brake, which can perform a braking action on the vehicle and on its coupling, particularly in the event of the failure of a service brake of the vehicle.

The regulation EU 2015/68 stipulates that there must be a dual restriction with respect to the handbrake (or parking brake) of the vehicle and with respect to the emergency brake:

When the parking brake is actuated, the pressure in the supplementary line must be zero when the parking brake is actuated to its maximum, and When the emergency brake is actuated, the latter must generate modulatable braking on the trailer when the vehicle speed is greater than 40 km/h.

This regulation therefore poses new problems for the implementation of the parking brake and the emergency brake, particularly in the case where the emergency brake function is fulfilled by the parking brake of the vehicle.

SUMMARY OF THE INVENTION

The aim of the present disclosure is thus to propose an answer to this problem.

For this purpose, the present disclosure makes provision for a method for driving a parking brake of a vehicle comprising a control line and a supplementary line suitable for being linked to a hydraulic braking system of a coupling, wherein the pressure is driven in the control line and in the supplementary line as a function of a setpoint applied to the parking brake between 0 and Cmax, said driving method being such that:

for a setpoint between 0 and C1, the pressure in the control line is zero, and the pressure in the supplementary line is kept at a constant non-zero value Psupp;

for a setpoint between C1 and C3, a braking pressure proportional to the setpoint is applied via the control line;

for a setpoint between C2 and Cmax, the pressure in the supplementary line is zero; said values being such that
0≤C1<C2≤Cmax, and
0≤C1<C3≤Cmax.

According to an example, for a setpoint between C1 and C2, the pressure in the supplementary line is kept at the constant value Psupp.

According to an example, for a setpoint between C3 and Cmax, the pressure in the control line is zero.

According to an example, the braking pressure proportional to the setpoint applied via the control line is linear and continuous for a setpoint between C1 and C3.

According to an example, the values of C1, C2 and C3 are modified as a function of the wear of the hydraulic braking system of the coupling.

According to an example, the values C1, C2 and C3 are such that
0.05<Cmax<C1<0.15 Cmax,
0.7<Cmax<C2<0.8 Cmax,
0.75<Cmax<C3<0.9 Cmax.

According to an example, the values C1, C2 and C3 are such that 0≤C1<C2<C3≤Cmax.

The present disclosure also relates to a hydraulic braking system of a vehicle comprising a control line and a supplementary line suitable for being linked to a hydraulic braking system of a coupling, a parking brake and a computer configured in such a way as to drive the pressure in the control line via a control valve and in the supplementary line via a supplementary valve as a function of a setpoint applied to the parking brake between 0 and Cmax, said computer being configured in such a way as to for a setpoint between 0 and C1, drive the control valve such that the pressure in the control line is zero, and drive the supplementary valve such that the pressure in the supplementary line is kept at a constant non-zero value Psupp;

for a setpoint between C1 and C3, drive the control valve such that the pressure in the control line is proportional to said setpoint;

for a setpoint between C2 and Cmax, drive the supplementary valve such that the pressure in the supplementary line is zero; said values being such that
0≤C1<C2≤Cmax, and
0≤C1<C3≤Cmax.

According to an example, the computer is configured in such a way as to, for a setpoint between C1 and C2, drive the supplementary valve such that the pressure in the supplementary line is kept at the constant value Psupp.

According to an example, the computer is configured in such a way as to, for a setpoint between C3 and Cmax, drive the control valve such that the pressure in the control line is zero.

According to an example, the braking pressure proportional to the setpoint applied via the control line is continuous for a setpoint between C1 and C3, typically linear and continuous for a setpoint between C1 and C3.

According to an example, the computer is configured in such a way as to modify the values of C1, C2 and C3 as a function of the wear of the hydraulic braking system of the coupling.

According to an example, the values C1, C2 and C3 are such that
0.05<Cmax<C1<0.15 Cmax,
0.7<Cmax<C2<0.8 Cmax, 0.75<Cmax<C3<0.9 Cmax.

According to an example, the values C1, C2 and C3 are such that 0≤C1<C2<C3≤Cmax.

The present disclosure furthermore relates to a vehicle equipped with such a system.

BRIEF DESCRIPTION OF THE DRAWINGS

The invention and its advantages will be better understood on reading the detailed description given below of different embodiments of the invention given way of non-limiting example. This description refers to the appended pages of figures, wherein.

In all the figures, common elements are identified by identical reference numbers.

DESCRIPTION OF THE INVENTION

Figure 1:
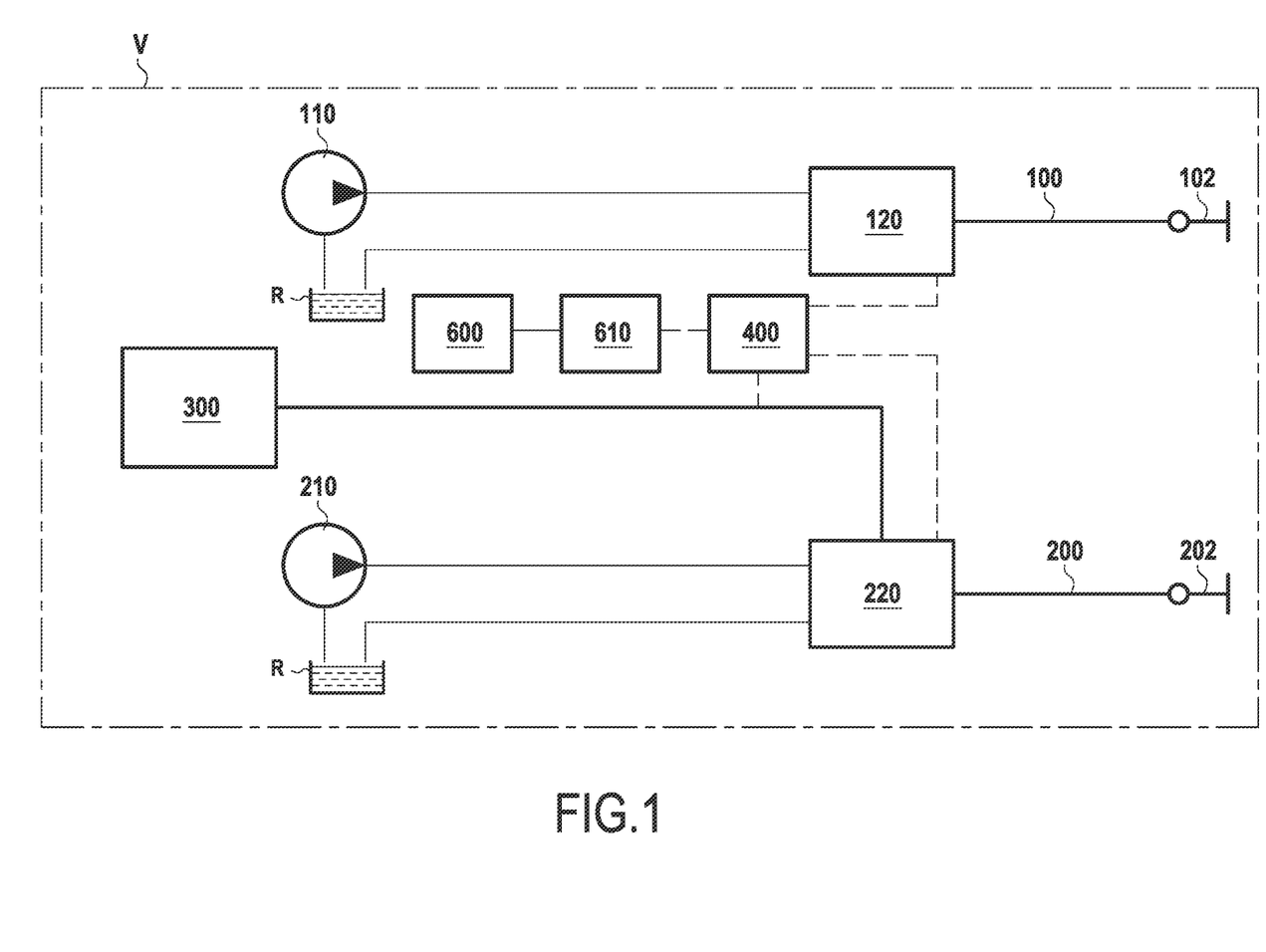
FIG. 1 schematically represents a system according to an aspect of the invention.

FIG. 1 shows an example of a hydraulic circuit of a vehicle according to an aspect of the invention.

This figure is a schematic representation of a vehicle V equipped with a hydraulic system comprising a supplementary line 100 and a control line 200.

The supplementary line 100 is linked to a supplementary connector 102, and the control line is linked to a control connector 202, said connectors 102 and 202 being suitable for being linked to a hydraulic coupling circuit as defined in the standard EU 2015/68, and such as for example shown in the patent application FR3037023.

The supplementary line 100 is supplied by a supplementary pressure source 110, associated with a supplementary valve 120 used to drive the pressure in the supplementary line 100 and delivered to the supplementary connector 102. The supplementary line 100 is typically linked to a negative-action brake of a coupling, i.e. a brake that is engaged by default, and which is disengaged when a sufficient pressure is applied. Typically a pressure that is low or less than a threshold value in the supplementary line 100 causes the enabling of a parking brake of the vehicle V either by the use of a so-called negative brake, which then applies the braking force by default (i.e. in the absence of pressure) or by draining a fluid reservoir, typically a pressure accumulator, into a positive brake (which applies a braking force when a braking pressure is applied), this draining being actuated or driven by the detection of a pressure less than a threshold pressure value in the supplementary line 100, for example using a pressure switch.

The control line 200 is supplied by a control pressure source 210, associated with a control valve 220 used to drive the pressure in the control line 200 and delivered to the control connector 202. The control line 200 is typically linked to a positive-action brake of a coupling, i.e. a brake that is disengaged by default, and which exerts a braking action proportional to the pressure that is applied to it. In the example represented in FIG. 1, the supplementary pressure source 110 and the control pressure source 210 are separate. In a variant, this can be one and the same pressure source, the operation then being unchanged.

The vehicle V comprises a computer 400, that will be commonly referred to as an ECU (Electronic Control Unit).

The vehicle V also comprises a braking control 300, typically an actuator such as a brake pedal directly driven by the user, in such a way as to apply a braking pressure Pf. The control valve 220 is driven by the computer 400 and by the braking pressure Pf, such that a control pressure Pc delivered by the control valve 220 to the control line 200 is a function of the braking pressure Pf.

The vehicle V comprises a parking brake 600 equipped with an actuator 610 that can be actuated by the user, typically a handbrake lever, a handbrake control or a pedal that can provide mechanical driving of the parking brake 600 for example by means of a cable, or an electronic actuator thus driving the parking brake 600 via the computer 400. FIG. 1 illustrates the embodiment wherein the actuator 610 provides the mechanical driving of the parking brake 600. The actuator 610 can thus apply a setpoint C between 0 and Cmax, a setpoint value equal to 0 corresponding to a state wherein the parking brake 600 is totally disengaged. The term "parking brake" is understood to mean a vehicle brake separate from a service brake, the service brake being the brake used to modulate the speed of the vehicle when it is travelling, whereas the parking brake is used to immobilize the vehicle when the engine is stopped.

The setpoint C or stroke applied to the actuator 610 of the parking brake 600 is measured for example by means of a potentiometer, and is transmitted to the computer 400, which drives the supplementary valve 120 and the control valve 220 in order to modulate the pressure delivered to the supplementary line 100 and to the control line 200 as a function of this setpoint.

Figure 2:
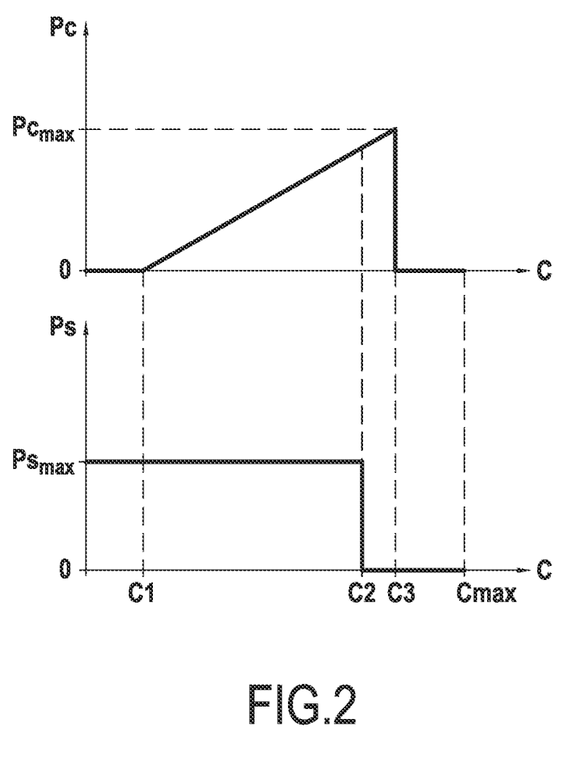
FIG. 2 schematically illustrates a method according to an aspect of the invention.

FIG. 2 schematically illustrates the method of controlling the supplementary valve 120 and the control valve 220 by the computer 400 as a function of the setpoint applied to the actuator 610 of the parking brake 600.

This figure represents two graphs, illustrating the pressure Pc in the control line 200 and a pressure Ps in the supplementary line 100 as a function of the setpoint C applied to the actuator 610 of the parking brake 600.

On the graphs are identified several setpoint values, C1, C2 and C3, between 0 and Cmax, and such that 0≤C1<C2≤Cmax and 0≤C1<C3≤Cmax, or typically such that 0≤C1<C2≤C3≤Cmax, or else typically such that 0<C1<C2<C3<Cmax.

For a setpoint between 0 and C1, the computer 400 drives the supplementary valve 120 and the control valve 220 such that no braking force is applied via the control line 200 or via the supplementary line 100.

The pressure applied via the supplementary line 100 is thus constant and equal to a value Psmax, corresponding to the pressure needed to disengage a coupling brake linked to the supplementary line 100. The pressure in the control line 200 is zero.

This first interval between 0 and C1 thus defines a safety margin making it possible to ensure that the coupling of the vehicle V is not braked when the parking brake 600 is disengaged and also to make sure that the driver's braking is deliberate, by not braking if the parking brake 600 is not properly returned to its disengaged position by the user, typically if the user does not return the actuator 610 of the parking brake 600 to a position corresponding to a setpoint C equal to 0.

For a setpoint between C1 and C2, the computer 400 maintains a constant pressure Psmax in the supplementary line 100, and drives the control valve 220 such that a braking pressure proportional to the setpoint is applied via the control line 200. The braking pressure applied via the control line 200 is typically linear, in the form of a ramp.

This interval between C1 and C2 thus defines a range of values wherein a gradual braking can be driven by means of the parking brake 600 via its actuator 610, which thus here fulfils an emergency braking function.

For a setpoint between C2 and C3, the computer 400 continues to drive the control valve 220 such that a braking pressure proportional to the setpoint is applied via the control line 200. The pressure Pc applied via the control line 200 is here also typically linear, in the form of a ramp, in the extension of the ramp for the setpoint between C1 and C2, until a pressure Pcmax is reached when the setpoint C is equal to C3. The pressure Ps applied via the supplementary line 100 is meanwhile returned to 0.

This interval between C2 and C3 thus defines a range of values wherein the coupling is braked due to the pressure drop in the supplementary line 100. This pressure drop will specifically cause a braking force on the coupling, for example by means of a so-called negative brake, which then applies the braking force by default (i.e. in the absence of pressure), or by draining a fluid reservoir, typically a pressure accumulator, into a positive brake (which applies a braking force when a braking pressure is applied), this draining being actuated or driven by the detection of a pressure less than a threshold pressure value in the supplementary line 100, for example using a pressure switch. The brake supplied by the control line 200 continues to exert an increasing braking force.

This interval between C2 and C3 is typically quite small, and defines a range of overlap making it possible to ensure that there is a continuity between the braking exerted by the control line 600 and the braking performed by the negative-effect brake linked to the supplementary line 100. In this way it is ensured that there is no position of the actuator 610 of the parking brake 600 that produces no braking effort on the coupling A.

In a variant, the values C2 and C3 are equal. The interval between C2 and C3 is therefore zero; there is no overlap range. The system then passes directly from the braking performed by the control line 600 to the braking carried out by the negative-effect brake.

In another variant, the values C2 and of C3 are such that C3<C2. In this variant, there is then no continuity between the braking exerted by the control line and the braking performed by the negative-effect brake linked to the supplementary line 100. However, insofar as a maximum braking is reached for a setpoint value equal to C3, the transition from C3 to C2 is then performed while the vehicle V is stopped or has sufficiently slowed, which can thus manifest as a negligible or even non-existent jolt as a function of the speed of application of the setpoint C.

For a setpoint between C3 and Cmax, the pressure Ps in the supplementary line 100 is kept at 0, and the pressure Pc in the control line 200 is returned to 0.

In this interval, the coupling and the vehicle V are stopped. The zero pressure in the supplementary line 100 and in the control line 200 permits the connection or disconnection of the hydraulic ducts of the coupling with the connectors 102 and 202 of the vehicle V.

This control method thus defines several states as a function of the setpoint C applied to the actuator 610 of the parking brake 600, to combine the functions of emergency brake and parking brake in a single parking brake.

The values of C1, C2 and C3 can be determined in such a way as to modify the amplitude of the different intervals according to the desired behavior of the parking brake 600.

The value C1 is typically between 5% Cmax and 15% Cmax, typically equal to 10% Cmax.

The value C2 is typically between 70% Cmax and 80% Cmax, typically equal to 75% Cmax.

The value C3 is typically between 75% Cmax and 90% Cmax, typically equal to 80% Cmax.

For the sake of ergonomics, it can for example be envisioned that the values C1, C2, and C3 are each less than a predetermined value, for example 50% Cmax. By way of example, the values C1, C2 and C3 can then be such that 0.05 Cmax<C1<0.015 Cmax, 0.3 Cmax<C2<0.45 Cmax, and 0.4 Cmax<C3<0.5 Cmax.

The proposed system and method thus make it possible to fulfil the functions of emergency brake and parking brake by means of a single control (here the actuator 610). The function of emergency braking of the coupling is performed gradually according to the command applied by the user, as is already the case for the emergency braking of a vehicle, making it possible to avoid risks of jack-knifing or deterioration of the brakes of the vehicle and its associated coupling.

Moreover, the proposed system and method are easily parametrizable, particularly by modifying the values of C1, C2 and C3, which can thus make it possible to modulate the different intervals, for example as a function of the wear of the brake, this wear being able to be estimated, for example automatically, particularly by programming a forecasted wear into the computer 400.

Figure 3:
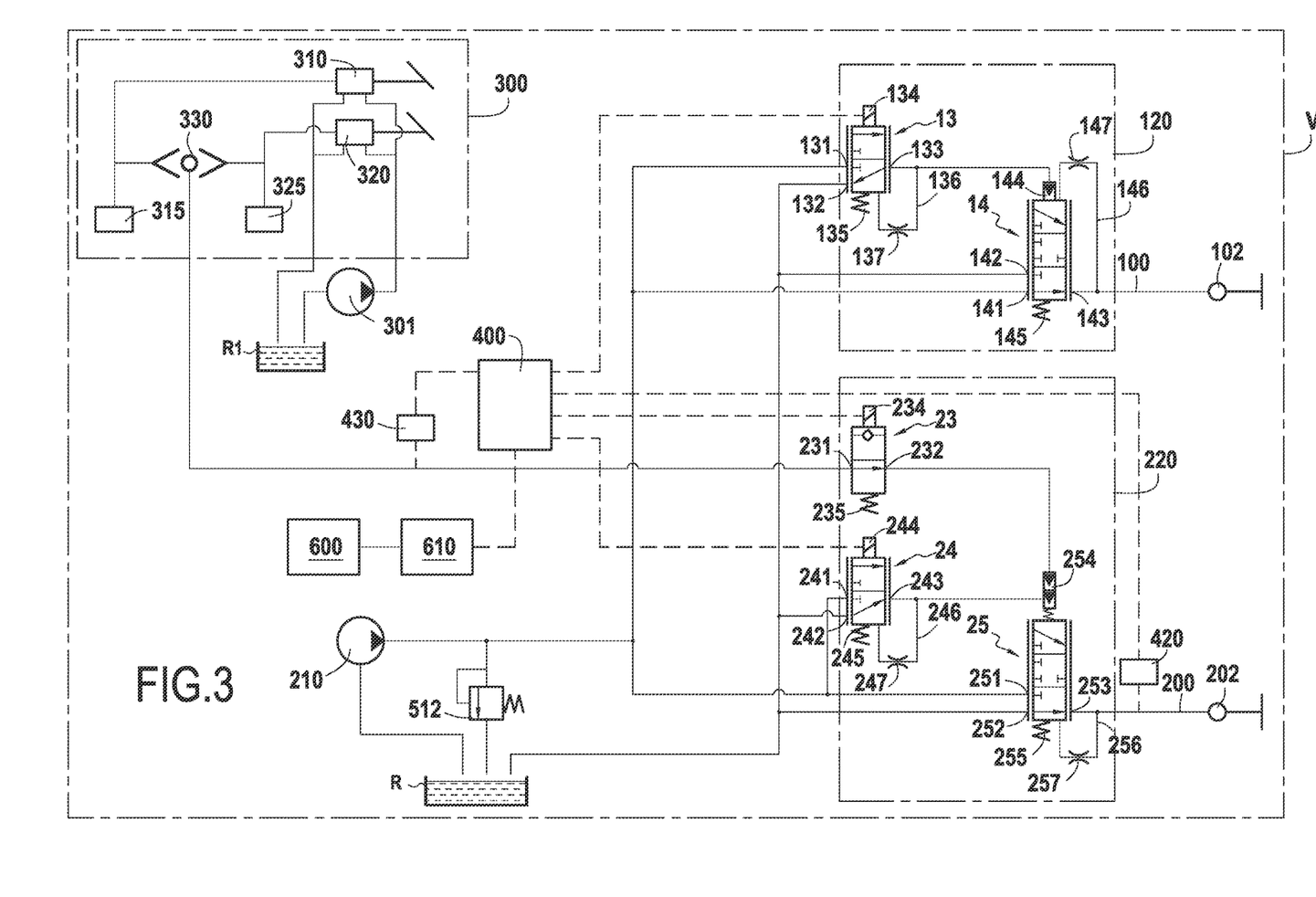
FIGS. 3 and 4 represent two variants of the system represented in FIG. 1.

FIG. 3 illustrates a variant of the system shown previously with reference to FIG. 1.

The vehicle V comprises a braking control 300, typically an actuator such as a brake pedal directly driven by the user, in such a way as to apply a braking pressure Pf. The control valve 220 is driven by the braking pressure Pf, such that a control pressure Pc delivered by the control valve 220 to the control line 200 is a function of the braking pressure Pf. The braking control 300 as represented comprises two braking actuators 310 and 320, each driving a brake, respectively 315 and 325, for one side (right or left) of the vehicle V. Such a braking control structure is used in particular for agricultural vehicles, and facilitates turning. It will be understood that the invention is also applicable for a braking control 300 having a single braking actuator for both sides of a vehicle, the illustrated example of a braking control 300 being purely illustrative and non-limiting.

The braking actuators 310 and 320 are each linked to a braking pressure source 301 and to a first reservoir R1 from which the braking pressure source 301 bleeds a first fluid.

The braking control 300 comprises a high-pressure selector 330, such that the pressure at the outlet of the braking control 300, i.e. the braking pressure Pf, corresponds to the highest pressure out of that delivered by the braking actuators 310 and 320. The computer 400 is associated with a braking pressure sensor 430 which thus measures the braking pressure Pf at the outlet of the high-pressure selector 330.

In the embodiment represented, the supplementary pressure source 110 and the control pressure source 210 are one and the same pressure source, here a hydraulic pump denoted by the reference 510.

The pressure source 510 is associated with a pressure limiter 512 suitable for discharging an excess of pressure beyond a threshold pressure value into a second reservoir R2 from which the pressure source 510 draws a second fluid.

The supplementary valve 120 as represented comprises two valves; a supplementary driving valve 13 and a supplementary outlet valve 14.

The supplementary driving valve 13 comprises a first orifice 131 linked to the supplementary pressure source 110, a second orifice 132 linked to a reservoir R2, and a third orifice 133. It is understood that the circuit proposed on FIG. 3 makes it possible to use separate fluids for the braking control 300 on the one hand, and for the supplementary line 100 and the control line 200 on the other hand. If one and the same fluid is used, the hydraulic pumps 301 and 510 can be one and the same pump, and the tanks R1 and R2 can be one and the same reservoir.

The supplementary driving valve 13 is driven by an electrical control 134 linked to the computer 400, which is opposed by an elastic return means 135 and a spur line 136 equipped with a restrictor 137 bleeding the pressure at the third orifice 133.

The supplementary driving valve 13 thus alternates between a first configuration wherein the first orifice 131 is closed and the second orifice 132 is linked to the third orifice 133, and a second configuration wherein the first orifice 131 is linked to the third orifice 133 and the second orifice 132 is closed. The supplementary driving valve 13 is by default (i.e. if no command is applied by the electrical control 134) in its first configuration. The supplementary driving valve 13 is a proportional valve, such that the pressure at its third orifice 133 is proportional to the command applied via the electrical control 134.

By way of variant the supplementary driving valve 13 can be a non-proportional two-position valve (a valve which is known as an ON/OFF valve). In this case the spur line 136 and its restrictor 137 are not present.

The supplementary outlet valve 14 comprises a first orifice 141 linked to the pressure source 510, a second orifice 142 linked to the second reservoir R2, and a third orifice 143 linked to the supplementary connector 102.

The supplementary outlet valve 14 is driven by a hydraulic control 144 linked to the third orifice 133 of the supplementary driving valve 13 which is opposed by an elastic return means 145. A spur line 146 equipped with a restrictor 147 bleeds the pressure at the third orifice 143 and then applies it in opposition to the elastic return means 145.

The supplementary outlet valve 14 is driven proportionately between a first configuration wherein the first orifice 141 is linked to the third orifice 143 and the second orifice 142 is closed, and a second configuration wherein the first orifice 141 is closed, and the second orifice is linked to the third orifice 143.

The control valve 220 as represented comprises three valves; an on/off solenoid valve 23, a proportional solenoid valve 24, and a proportional valve 25.

The on/off solenoid valve 23 is driven by an electrical control 234 linked to the computer 400, which is opposed by an elastic return means 235. It has a first orifice 231 linked to the high-pressure selector 330, and a second orifice 232. The on/off solenoid valve 23 is configured to allow the passage of fluid solely from its first orifice toward its second orifice 232, or to allow the passage of fluid solely from its second orifice 232 toward its first orifice 233.

The proportional solenoid valve 24 comprises a first orifice 241 linked to the pressure source 510, a second orifice 242 linked to the second reservoir R2, and a third orifice 243.

The proportional solenoid valve 24 is driven by an electrical control 244 linked to the computer 400, which is opposed by an elastic return means 245 and a spur line 246 bleeding the pressure at the third orifice 243 and equipped with a restrictor 247. The proportional solenoid valve 24 is driven proportionately between a first configuration wherein the first orifice 241 is closed, and the second orifice 242 is linked to the third orifice 243, and a second configuration wherein the first orifice 241 is linked to the third orifice 243, and the second orifice 242 is closed.

The proportional valve 25 has a first orifice 251 linked to the pressure source 510, a second orifice 252 linked to the second reservoir R2, and a third orifice 253 linked to the control connector 202.

The proportional valve 25 is driven by a hydraulic control 254, typically a dual-chamber actuator, linked to the second orifice 232 of the on/off solenoid valve 23 and to the third orifice 243 of the proportional solenoid valve 24, in such a way as to apply a control corresponding to the highest pressure between the pressure at the second orifice 232 of the on/off solenoid valve 23 and at the third orifice 243 of the proportional solenoid valve 24. An elastic return means 255 and a spur line 256 equipped with a restrictor 257 oppose the hydraulic control 254, the spur line bleeding the pressure at the third orifice 253.

The proportional valve 25 is driven proportionately between a first configuration wherein the first orifice 251 is closed and the second orifice 252 is linked to the third orifice 253, and a second configuration wherein the first orifice 251 is linked to the third orifice 253 and the second orifice 252 is closed. The pressure delivered to the third orifice 253 is therefore proportional to the pressure applied by the hydraulic control 254. The pressure delivered to the third orifice is the control pressure Pc measured by a control pressure sensor 420 and communicated to the computer 400.

In operation, the computer 400 will drive the electrical controls 134, 234 and 244 of the supplementary driving valve 13, of the on/off solenoid valve 23 and the proportional solenoid valve 24 respectively, in order to modulate the pressure in the supplementary line 100 and in the control line 200, particularly as a function of the setpoint C applied to the actuator 610 of the parking brake 600 as already detailed previously.

This embodiment makes it possible to ensure the supply of the control line 200 and the supplementary line 100 even in the event of an electrical fault of the system, and in particular makes it possible to preserve a variable braking function, albeit degraded by comparison with normal operation, even in the event of a power failure.

Figure 4:
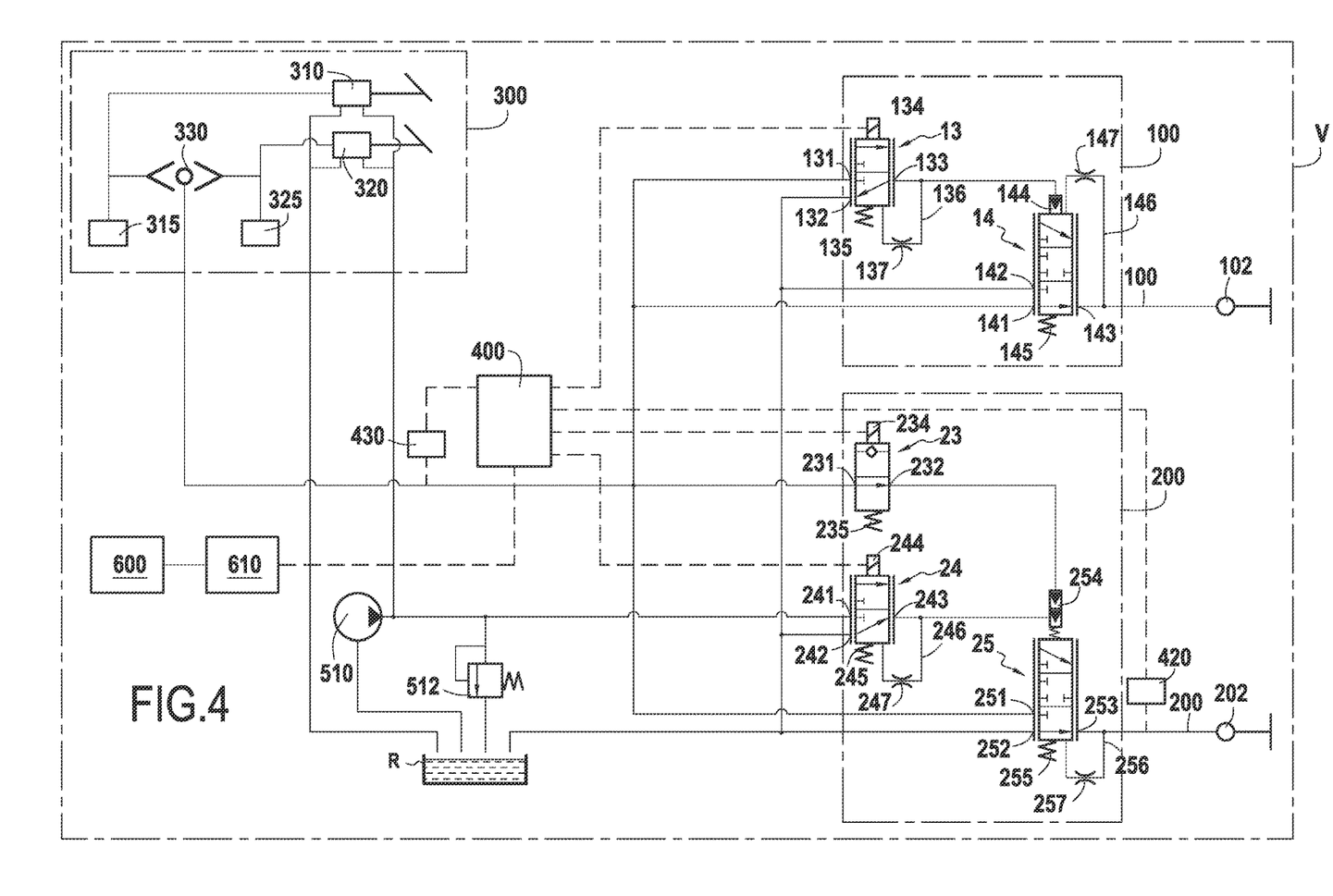

FIG. 4 shows a variant of the embodiment. Here also, the supplementary pressure source 110 and the control pressure source 210 shown previously in FIG. 1 are one and the same pressure source, here a hydraulic pump denoted by the reference 510.

The pressure source 510 is associated with a pressure limiter 512 suitable for discharging an excess of pressure beyond a threshold pressure valve into a reservoir R.

In this embodiment, the braking pressure source 301 is removed; the braking control 300 is here supplied by the pressure source 510; a single fluid is used here, bled from a single reservoir R.

As for the embodiment already described with reference to FIG. 3, the pressure source 510 is associated with a pressure limiter 512 suitable for discharging an excess of pressure beyond a threshold pressure value into a reservoir R.

The operation remains unchanged with respect to the embodiment already described with reference to the previous figures.

Although the present invention has been described with reference to specific exemplary embodiments, it is obvious that modifications and changes can be made to these examples without departing from the general scope of the invention as defined by the claims. In particular, individual features of the different embodiments illustrated/mentioned can be combined in additional embodiments. Consequently, the description and the drawings must be considered in an illustrative sense rather than a restrictive sense.

It is also obvious that all the features described with reference to a method are transposable, alone or in combination, to a device, and conversely, all the features described with reference to a device are transposable, alone or in combination, to a method.

The invention claimed is:

1. A method for driving a parking brake of a vehicle, comprising a control line and a supplementary line suitable for being linked to a hydraulic braking system of a coupling, wherein the pressure is driven in the control line and in the supplementary line as a function of a setpoint applied to the parking brake between 0 and Cmax, said driving method being such that:
   for a setpoint between 0 and C1, the pressure in the control line is zero, and the pressure in the supplementary line is kept at a constant non-zero value Psupp;
   for a setpoint between C1 and C3, a braking pressure proportional to the setpoint is applied via the control line;
   for a setpoint between C2 and Cmax, the pressure in the supplementary line is zero;
   said values being such that
   $0 \leq C1 < C2 \leq Cmax$, and
   $0 \leq C1 < C3 \leq Cmax$.

2. The method as claimed in claim 1, wherein for a setpoint between C1 and C2, the pressure in the supplementary line is kept at the constant value Psupp.

3. The method as claimed in claim 1, wherein for a setpoint between C3 and Cmax, the pressure in the control line is zero.

4. The method as claimed in claim 1, wherein the braking pressure proportional to the setpoint applied via the control line continuous for a setpoint between C1 and C3.

5. The method as claimed in claim 1, wherein the values of C1, C2 and C3 are modified as a function of the wear of the hydraulic braking system of the coupling.

6. The method as claimed in claim 1, wherein the values C1, C2 and C3 are such that
   $0.05\ Cmax < C1 < 0.15\ Cmax$,
   $0.7\ Cmax < C2 < 0.8\ Cmax$,
   $0.75\ Cmax < C3 < 0.9\ Cmax$.

7. The method as claimed in claim 1, the values C1, C2 and C3 are such that $0 \leq C1 < C2 < C3 \leq Cmax$.

8. The method as claimed in claim 2, wherein for a setpoint between C3 and Cmax, the pressure in the control line is zero.

9. The method as claimed in claim 8, wherein the braking pressure proportional to the setpoint applied via the control line is continuous for a setpoint between C1 and C3.

10. The method as claimed in claim 2, wherein the braking pressure proportional to the setpoint applied via the control line is continuous for a setpoint between C1 and C3.

11. The method as claimed in claim 3, wherein the braking pressure proportional to the setpoint applied via the control line is continuous for a setpoint between C1 and C3.

12. The method as claimed in claim 2, wherein the values of C1, C2 and C3 are modified as a function of the wear of the hydraulic braking system of the coupling.

13. The method as claimed in claim 3, wherein the values of C1, C2 and C3 are modified as a function of the wear of the hydraulic braking system of the coupling.

14. A hydraulic braking system of a vehicle, comprising a control line and a supplementary line suitable for being linked to a hydraulic braking system of a coupling, a parking brake and a computer configured in such a way as to drive the pressure in the control line via a control valve and in the supplementary line via a supplementary valve as a function of a setpoint applied to the parking brake between 0 and Cmax,
   said computer being configured in such a way as to
      for a setpoint between 0 and C1, drive the control valve such that the pressure in the control line is zero, and drive the supplementary valve such that the pressure in the supplementary line is kept at a constant non-zero value Psupp;
      for a setpoint between C1 and C3, drive the control valve such that the pressure in the control line is proportional to said setpoint;
      for a setpoint between C2 and Cmax, drive the supplementary valve such that the pressure in the supplementary line is zero;
   said values being such that
   $0 \leq C1 < C2 \leq Cmax$, and
   $0 \leq C1 < C3 \leq Cmax$.

15. The system as claimed in claim 14, wherein the computer is configured in such a way as to, for a setpoint between C1 and C2, drive the supplementary valve such that the pressure in the supplementary line is kept at the constant value Psupp.

16. The system as claimed in claim 14, wherein the computer is configured in such a way as to, for a setpoint between C3 and Cmax, drive the control valve such that the pressure in the control line is zero.

17. The system as claimed in claim 14, wherein the braking pressure proportional to the setpoint applied via the control line is continuous for a setpoint between C1 and C3.

18. The system as claimed in claim 14, wherein the values C1, C2 and C3 are such that
   $0.05\ Cmax < C1 < 0.15\ Cmax$,
   $0.7\ Cmax < C2 < 0.8\ Cmax$,
   $0.75\ Cmax < C3 < 0.9\ Cmax$.

19. The system as claimed in claim 14, wherein the values C1, C2 and C3 are such that $0 \leq C1 < C2 < C3 \leq Cmax$.

20. A vehicle comprising a system as claimed in claim 14.

* * * * *

UNITED STATES PATENT AND TRADEMARK OFFICE
CERTIFICATE OF CORRECTION

| | | |
|---|---|---|
| PATENT NO. | : 11,827,198 B2 | Page 1 of 1 |
| APPLICATION NO. | : 17/258791 | |
| DATED | : November 28, 2023 | |
| INVENTOR(S) | : André Prigent | |

It is certified that error appears in the above-identified patent and that said Letters Patent is hereby corrected as shown below:

In the Claims

Column 9, Line 36, Claim 4, after "line" insert -- is --

Signed and Sealed this
Twenty-third Day of January, 2024

*Katherine Kelly Vidal*

Katherine Kelly Vidal
*Director of the United States Patent and Trademark Office*